United States Patent
Eiriksson

(10) Patent No.: US 9,444,769 B1
(45) Date of Patent: Sep. 13, 2016

(54) METHOD FOR OUT OF ORDER PLACEMENT IN PDU-ORIENTED PROTOCOLS

(71) Applicant: Chelsio Communications, Inc., Sunnyvale, CA (US)

(72) Inventor: Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 0 days.

(21) Appl. No.: 14/675,619

(22) Filed: Mar. 31, 2015

(51) Int. Cl.
*H04L 29/08* (2006.01)
*H04L 12/861* (2013.01)

(52) U.S. Cl.
CPC ......... *H04L 49/9057* (2013.01); *H04L 69/324* (2013.01)

(58) Field of Classification Search
CPC .................. H04L 49/9057; H04L 69/324
See application file for complete search history.

(56) References Cited

U.S. PATENT DOCUMENTS

| | | | |
|---|---|---|---|
| 7,389,462 B1* | 6/2008 | Wang et al. | 714/748 |
| 2002/0037000 A1* | 3/2002 | Park et al. | 370/349 |
| 2002/0095512 A1* | 7/2002 | Rana et al. | 709/232 |
| 2003/0084185 A1* | 5/2003 | Pinkerton | 709/236 |
| 2004/0049600 A1* | 3/2004 | Boyd | G06F 12/145 709/250 |
| 2005/0226238 A1 | 10/2005 | Hoskote et al. | |
| 2006/0031524 A1 | 2/2006 | Freimuth et al. | |
| 2006/0075119 A1 | 4/2006 | Hussain et al. | |
| 2006/0168094 A1* | 7/2006 | Makhervaks et al. | 709/216 |
| 2007/0011358 A1 | 1/2007 | Wiegert et al. | |
| 2007/0165672 A1* | 7/2007 | Keels et al. | 370/474 |
| 2008/0273532 A1 | 11/2008 | Bar-David et al. | |

\* cited by examiner

*Primary Examiner* — Curtis A Alia
(74) *Attorney, Agent, or Firm* — Beyer Law Group LLP

(57) ABSTRACT

Received PDU's, when inductively determined to be not aligned with a byte-stream payload, are stored within an intermediate dedicated buffer memory and then are read and further processed once alignment of further received PDU's has been derived and a whole PDU has been buffered. A PDU can then be read from the dedicated memory buffer and the PDU payload portion placed in the final destination buffer in system memory. Received PDU's when determined to be aligned with a byte-stream payload are placed in the final destination buffers in system memory, and when the PDU's arrive out-of-order are placed out of order in the final destination buffers.

16 Claims, 6 Drawing Sheets

METHOD FOR OUT OF ORDER PLACEMENT IN PDU-ORIENTED PROTOCOLS

TECHNICAL FIELD

The present invention relates to placing, into destination memory, responses for read requests according to a PDU-oriented protocol (such as RDMA) and payload data of writes and sends according to the PDU-oriented protocol, in the order that they arrive e.g. possibly out of order.

BACKGROUND

A network adaptor (e.g., a Network Interface Controller (NIC)) may be, for example, network interface circuitry, such as on a PCI card connected to a host computer via a PCI host bus. The network adaptor is typically used to couple the host CPU to a packet network through at least one interface, called a port. NIC circuitry has been an area of rapid development as advanced packet processing functionality and protocol offload have become requirements for so called "smart NICs".

SUMMARY

A network adaptor (or NIC) is equipped with RDMA or other PDU-oriented protocol capability and the ability to place out of order arriving PDU's directly into a user memory destination buffer. The capability decreases the size requirements of a dedicated out of order memory buffer and, in addition, decreases the end to end latency for transactions according to the PDU-oriented protocol where responses arrive to the NIC out-of-order.

DETAILED DESCRIPTION

Figure 1:
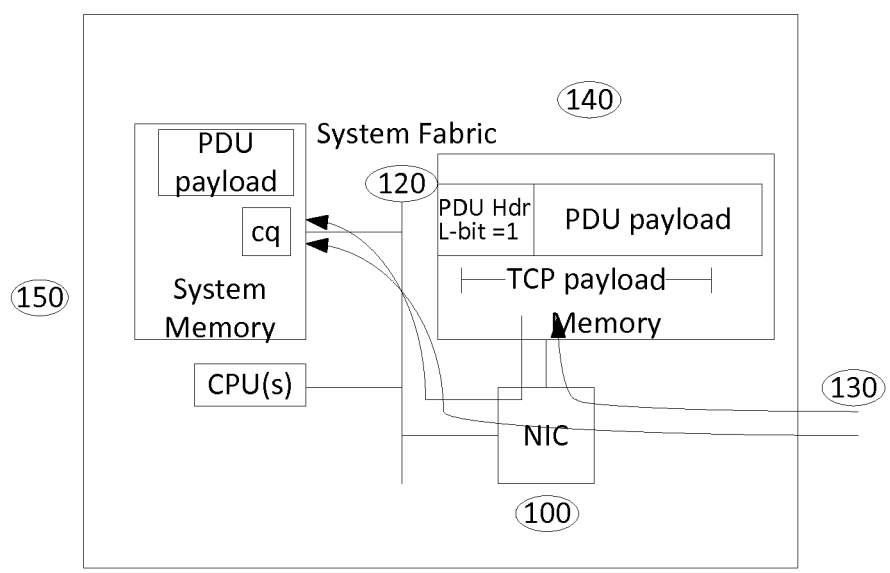
FIG. 1 is a block diagram illustrating a host system with a network adaptor and showing steps to deliver a network "byte stream" encapsulating a PDU-based segment.

We describe an enhancement for receive processing of an RDMA-capable NIC. Referring to FIG. 1, a NIC 100 is coupled to a host system memory 150, using an attachment bus 120. The attachment bus can be, for example, a PCI bus or it can be an ARM AMBA bus within a system on a chip (SoC). The RDMA capability is implemented using Protocol Data Units (PDU) embedded in the payload of a lower layer protocol. When RDMA is implemented on top of the TCP protocol, which is a byte stream protocol, it is not ensured that the PDU's will be aligned with the TCP segments, i.e. that a TCP segment will have a PDU header at the start of the TCP payload within the TCP segment, and it is not ensured even in the aligned case that the TCP payload will contain exactly one, or multiple whole PDU. The described enhancement includes apparatus and methods, and is also applicable to various other PDU-oriented protocols which are implemented on top of byte-stream protocols.

In the case where the PDU's are not aligned with the TCP payload, the receive processing typically includes storing inbound PDU-containing TCP segments 130 within an intermediate dedicated TCP buffer memory 140 and then reading and further processing the PDU's from this buffer memory once alignment has been derived and a whole PDU has been buffered. A PDU can then be read from the dedicated memory buffer 140 and the PDU payload portion placed in the final destination buffer in system memory 150. The destination buffer is, for example, an application buffer. An application buffer may be a memory store associated with an application executing on one or more host processors and is distinguished from memory associated with an operating system of the one or more host processors.

We note that, in general, the memory 140 can be the same physical memory (or at least in the same address space) as the system memory 150, or memory 140 can be a dedicated memory. Some RDMA adaptors, such as the T5 adaptor from Chelsio Communications of Sunnyvale, Calif., are capable of ensuring the alignment of PDU within TCP segments, when sending PDU-containing TCP segments, and the RDMA receiver in that case can place the inbound segments to the final destination memory (e.g., in the System Memory 150) without using the intermediate buffer 140. Even in this case, it is not ensured that the PDU's will be aligned within the received TCP segments. This is because middle boxes, for example deep packet intrusion detection boxes, and firewalls can re-segment the TCP packets, without regard to the alignment of PDU's within the lower layer(s). Further, due to reordering in the network from sender to receiver, and lost packets from RDMA sender to RDMA receiver, it is possible that TCP packets (and thus RDMA PDU's) will be received out of order in the aligned sending case.

We describe herein a process to safely place PDU's (using RDMA as an example) out of order. The process places in order and out of order RDMA PDU's directly into the destination memory (such as System Memory 150) when deemed possible and falls back to aligning the PDU in TCP buffer memory 140 when the more efficient direct placement process is not deemed possible. When the RDMA sender is sending PDU aligned, this will in most cases allow for a smaller memory buffer 140 and it will lead to lower latency because the PDU's will be placed in the final destination buffer 150 in more cases without intermediate copying. (While this description is in the context of TCP as the lower-layer protocol and RDMA as the higher layer protocol, the described system and processing is also applicable to other byte-stream and PDU-based interoperating protocols. This includes the SCTP protocol in place of the TCP protocol, and iSCSI in place of RDMA)

Figure 2A:
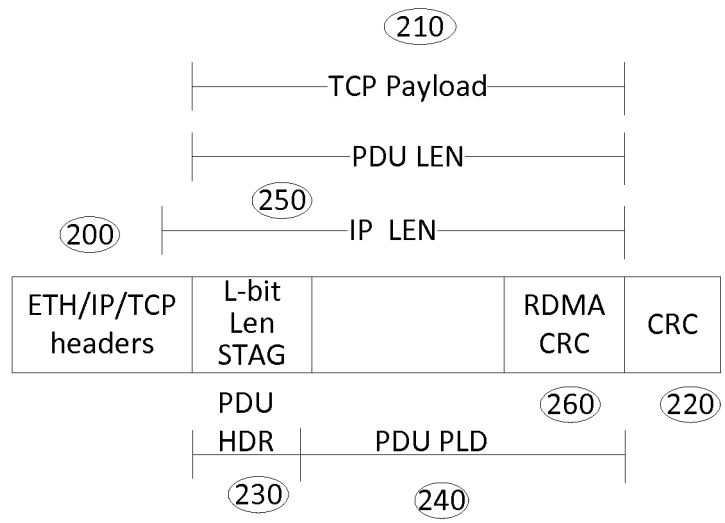
FIGS. 2a and 2b show an Ethernet TCP/IP frame that includes Ethernet, IP, and TCP headers, TCP payload, and an Ethernet CRC at the end of the Ethernet frame.
Figure 2B:
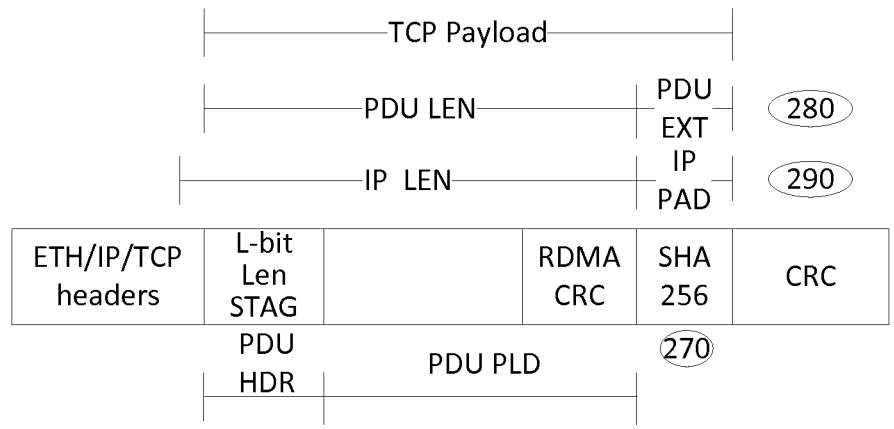

We now refer to FIG. 2, which shows an Ethernet TCP/IP 200 frame that includes Ethernet, IP, and TCP headers, TCP payload, and an Ethernet CRC 220 at the end of the Ethernet frame. In this case, the TCP payload contains an RDMA PDU that is aligned with the start of the TCP payload. The PDU header 230 includes a length field, and it includes an STAG (steering tag) that may be used to look up in a mapping table where the RDMA payload is to be placed. At the end of the PDU, there is a CRC code 260 that is computed over the whole PDU contents. In addition, as shown in FIG. 2b), the packet can optionally contain a cryptographic authentication code such as an SHA-256 hash. In FIG. 2b), it is assumed that the authentication hash is either stored in the IP datagram pad 290 or that the PDU length is extended to include the hash 280. The TCP header contains a sequence number, and the TCP/IP headers have length fields.

By speculatively computing the RDMA CRC over the TCP segment payload, as the TCP packet arrives, and comparing the computed CRC value with the value 260, where it would be in the TCP segment if it is assumed there is PDU alignment, and then looking at the PDU length field and validating that the TCP/IP length field and the PDU length fields match it is possible to determine that the PDU is aligned. An example of this process is discussed more fully below.

The determination can be strengthened even further by storing the candidate STAG's that are in use for a particular RDMA connection in a list, and validating that the extracted STAG from the assumed PDU header 230 is contained in this list. Furthermore, when authentication is optionally used after each PDU, validating the authentication value 270 can further strengthen the PDU alignment check.

The TCP state for the TCP connection of each RDMA queue pair, referred to as the TCB (which may include more than one RDMA queue pair), includes the sequence number rcv_nxt, which according to the TCP protocol is the next sequence number in order that is expected. In addition, the TCB stores information about out-of-order segments received in a data structure referred to as a fragment that has fields start_sequence_number, end_sequence_number, and contains a pointer to the data in memory, either in dedicated receive buffer memory or in host memory. In the following description frag0_start, frag0_end, frag1_start, and frag1_end refers to the sequence numbers stored to indicate the start and end of fragment 0 and fragment 1.

Figure 3A:
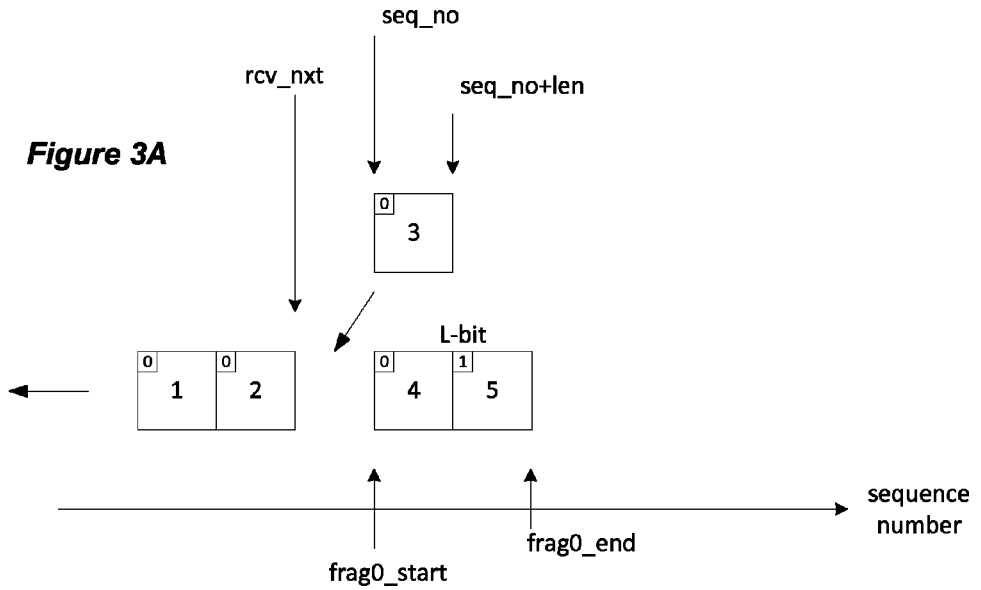
FIGS. 3a and 3b illustrate two different example orderings of PDU-containing TCP segments being sent, with a bit set in the RDMA header in the TCP payload of the last segment indicating the end of an RDMA operation.

Referring to FIG. 3a), the segments 1-5 are sent in the order 1, 2, 3, 4, and 5 with a bit set in the RDMA header in the TCP payload of segment 5, the L-bit, indicating the end of an RDMA operation. The five segments, for example, may include PDU's that are the payload of an RDMA read response, or an RDMA write, or an RDMA send. Due to reorder effects in the network, such as, for example, different TCP packets taking different paths through the network, or due to TCP packet loss caused by congestion or error conditions, or due to retransmission, the segments can, for example, arrive in the order 1, 2, 4, 5, and 3—i.e., with segment 3 (or even multiple segments) arriving out of order. The segments are placed in destination memory if they meet certain criteria to ensure that all the segments are placed correctly. The receiving circuitry verifies inductively that the segments are eventually all received and that any out of order placement is correct, and sends an RDMA completion (e.g., to host RDMA-handling functionality) when all the PDU's have been placed, in this case after segment 3 has been placed.

When RDMA segments arrive in order, the induction process operates as follows: segment 1 in FIG. 3 arrives at the start of the lifetime of the RDMA connection and therefore has an RDMA header including a length field that indicates the start of segment 2. If the RDMA PDU is aligned with the TCP payload, the next segment will start immediately at the beginning of the next TCP segment as indicated by the length fields in the PDU header. Then segment 2 arrives, and it has length that indicates where segment 3 starts, and when segment 3 arrives in order, it has length that indicates where segment 4 starts, and finally when segment 4 arrives in order, it has length that indicates where segment 5 starts.

Figure 3B:
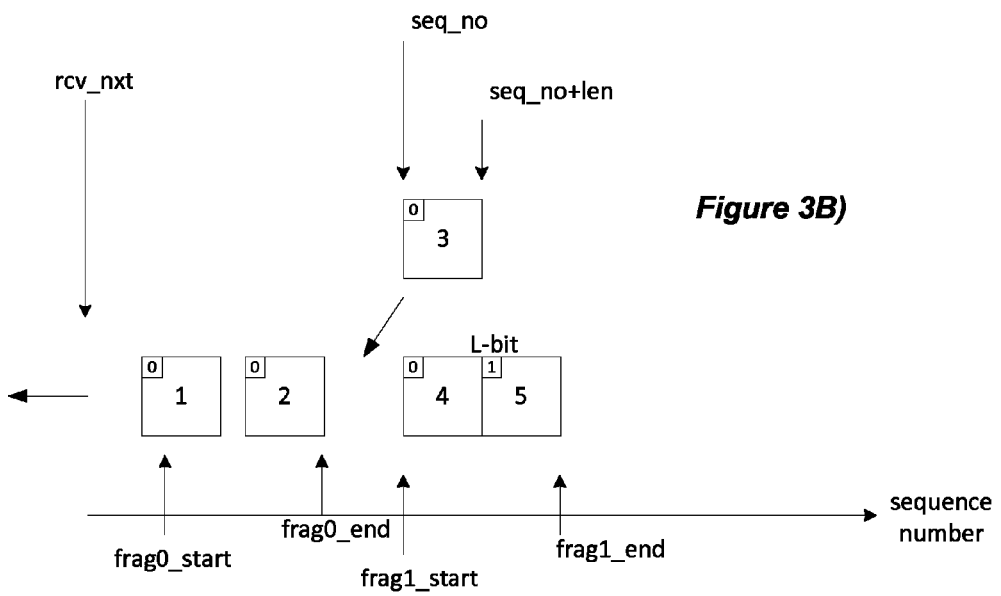

In the out of order case, however, the induction proceeds partially ordered. For the arrival order shown in FIG. 3, when segment 3 finally arrives, it is verified that segment 3 starts exactly after segment 2. Similarly, when segment 2 was placed, it was checked that segment 3 should start immediately behind segment 2, to the right of segment 2 in FIG. 3a). Finally, it is verified that segment 3 indicates that segment 4 should start exactly after segment 3. The out of order process refers to segments 4 and 5 as shown in FIG. 1 as an out of order fragment, and the receive process is capable of tracking several such islands simultaneously and on a per connection basis, storing an out-of-order-seq_no for the start and end of each such fragment. The check for segment 3 in FIG. 3 a) uses rcv_nxt to validate that segment 3 abuts segment 2 without any overlap; segments 1 and 2 have already been placed in destination memory at this point. The check for segment 3, when it arrives, uses frag0_start to validate that the segment abuts segment 4 without any overlap. In the case where segment 3 would be filling a gap that is not aligned with rcv_nxt, as shown in FIG. 3b), the check for segment 3 instead uses frag0_end to validate that segment 3 abuts segment 2 without any overlap. The check for segment 3 uses frag1_start to validate that the segment abuts segment 4 without any overlap.

The placement criteria includes a PDU-containing segment aligning exactly with a previous ordered segment if that segment has already arrived and aligning exactly with the following segment if that segment has already arrived. The segment 2 in FIG. 1 aligns exactly with segment 1, and there is no overlap between the two segments. Likewise, segment 5 aligns exactly with segment 4. Finally, segment 3 when it arrives aligns exactly both with segment 2 and with segment 4. Eventually, all the segments have arrived, and then all the alignment checks have been exhaustively verified, thereby verifying that all the out of order segments were placed correctly.

As discussed above, the receiver can perform a CRC check and a length check to increase the likelihood of correct speculative placement and to increase the likelihood of detecting that the segments are not arriving aligned. That is, the CRC check plus the length check is used as an approximation of a self-describing PDU attribute. A failing CRC and/or length check may be the earliest possible "alignment-not-present" check. The early CRC check enables a low latency optimization as it speeds up (potentially) the PDU processing e.g. when the CRC check passes the STAG lookup can start. A failing CRC check and/or length check raises an error condition.

The STAG access verifies that the placement is within bounds of the STAG and raises an error condition when the access is out of bounds It is possible for the CRC and length checks to "happen to" pass, but the wrong STAG, e.g., STAG-B is accessed instead of STAG-A, leading to corruption. The CRC value of two different packets can have the same value, they alias, and the length of two different packets can be equal. The STAG field, or what appears to be the STAG field, can map to STAG-B, all of this leading to a corrupting write to STAG-B rather than to STAG-A. The above scenario is also possible in the in order case, i.e. a packet is corrupted in such a way that the CRC does not indicate an error and, if that has been otherwise deemed to be acceptable i.e. the protection offered by the CRC is strong enough, the probability of a false positive is considered low enough to make this acceptable. In the following, we describe methods to detect corruption further by adding a 32B SHA256 signature at the end of the payload in the padding section of an IP frame.

The negotiation to use a 32B SHA256 signature can be part of the connection setup phase so that both the sender and receiver know that the signature is being used and the location of the signature in the received TCP segment. The receiver can then compute the 32B SHA256 over the received data and compare the computed value to the value stored in the received data, and if the two values agree it is determined with near certitude that the byte stream contains exactly one PDU.

Figure 4A:
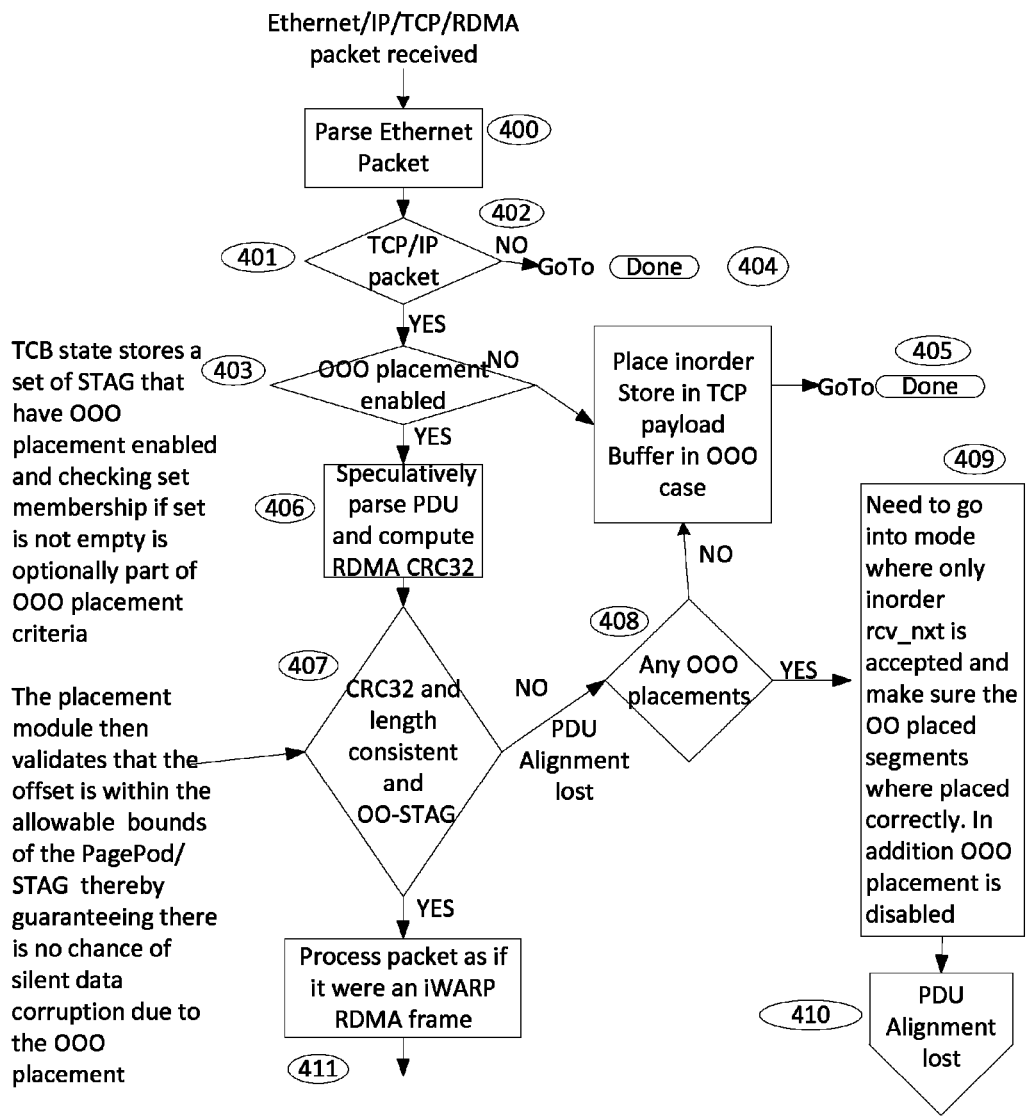
FIGS. 4a, 4b and 4c are collectively a flow diagram illustrating an example of processing of received IP packets where TCP payload includes PDU segments.
Figure 4B:
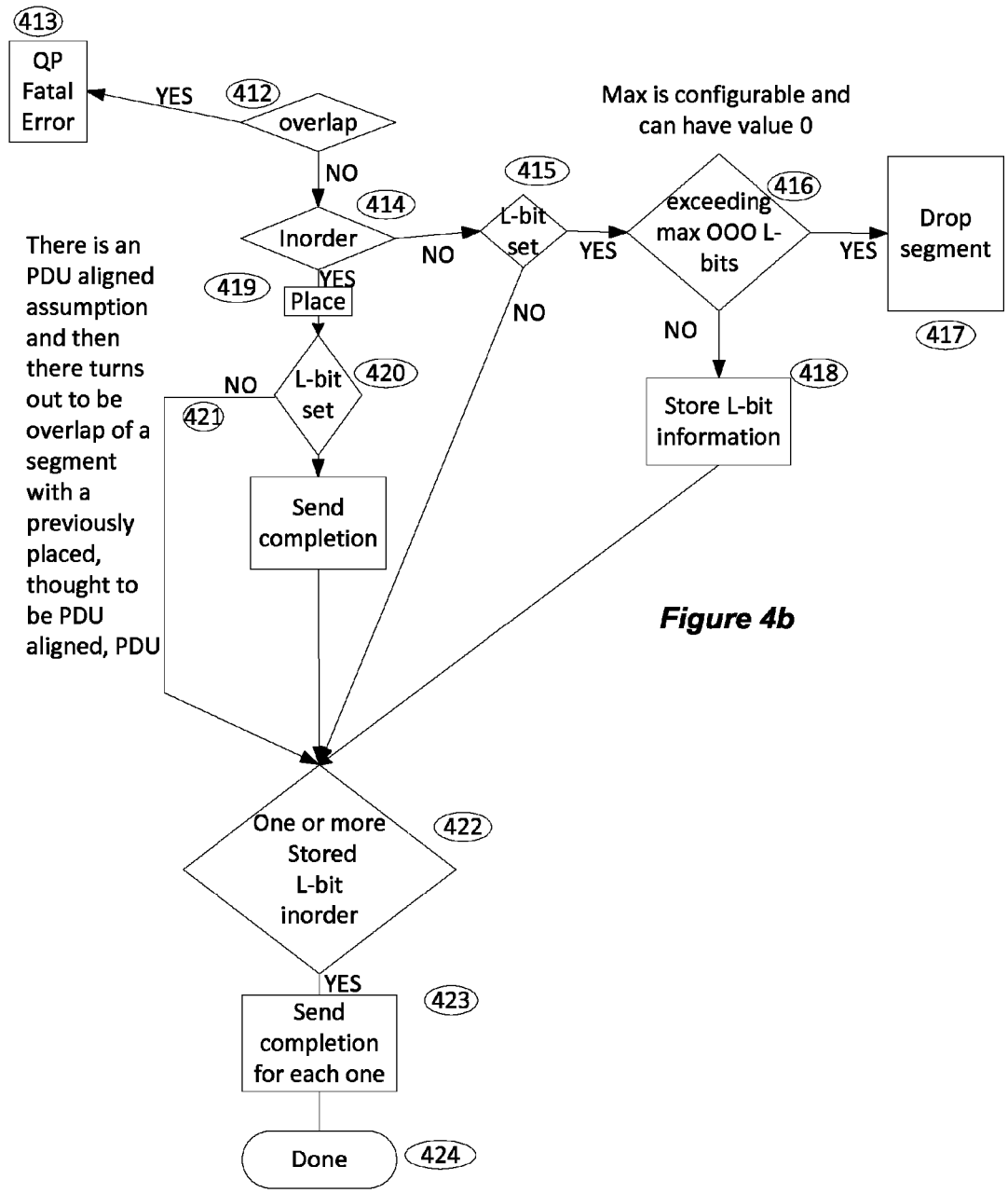

Refer now to FIG. 4, which shows an example flow diagram for the processing of received packets. The packet parser 400 determines if an Ethernet frame contains an IP packet and a TCP segment within the IP packet. For TCP segments, when out-of-order placement is enabled globally, the TCP payload is speculatively parsed 406 as if it contains a PDU, the length field is extracted from where it would be in the PDU header and the STAG field is also extracted and the CRC is computed. If the computed CRC matches the PDU CRC and the PDU length matches the TCP segment size, it is concluded that the TCP segment contains exactly one PDU 411. When the transmitter appears to be sending TCP aligned PDU's, it is a fatal error 413 if it turns out that the current PDU partially overlaps either with previously-delivered PDU or with out of order fragments. When there is no overlap, e.g., as determined by comparing the sequence numbers of the current TCP segment and the length of the current segment, and the TCP state variables rcv_nxt and each of the fragments, i.e., no overlap of the current segment and (frag0_start,frag0_end), (frag1_start,frag1_end), etc. for all the additional fragments supported. The next step 414 determines if the current segment aligns with rcv_nxt, i.e. is in order, and if yes 419, the current segment is placed in host destination memory, and if the PDU has the L-bit set, 420, a completion indication is also provided to the host (such as via the completion queue) which, for example, informs the host software how much data has been placed, and where it has been placed 423.

If out of order placement is not enabled in step 403, the PDU is only placed in host memory if the PDU aligns with rcv_nxt and, if out of order, is placed in a dedicated receive buffer 404.

If the PDU alignment check in 407 fails, it is assumed that the PDU is not being received aligned. If no previous PDU's have been placed out of order 408, the connection reverts to placing in order because apparently the sender is not sending PDU-aligned. If a previous PDU has been placed out of order 408, the receive process goes into recovery phase that is shown in FIG. 4c), where PDU's are only delivered in order and it is validated that no PDU previously placed out of order was in fact not a PDU, but instead the PDU alignment check in 407 gave an incorrect false positive or the sender possibly lost PDU alignment.

In other words, if a TCP segment is received, but it is determined that the received TCP segment does not include an aligned PDU, then the safe thing to do thereafter, if there were previously out of order PDU placements and until PDU alignment is achieved again, is to only accept TCP segments in order (since accepting out of order TCP segments would only compound the issue). In accepting TCP segments in order, an attempt is made to exactly fill the gaps. If the gaps are not exactly filled, then there is overlap and the RDMA connection is aborted.

Figure 4C:
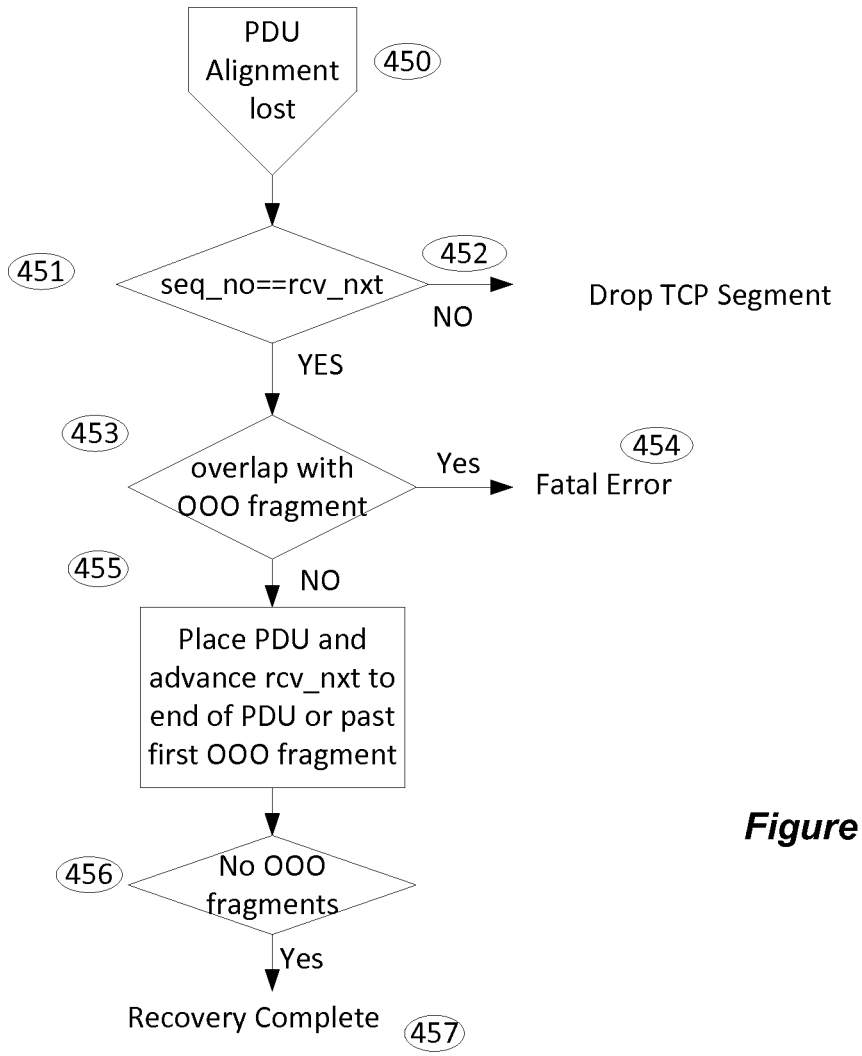

In FIG. 4c, at 450 it has been determined that PDU alignment has been lost and some out-of-order PDU's have already been placed. There is therefore the possibility that some of those already-placed PDU's had erroneously been placed. In recovery mode, only TCB segments that arrive in order, that are aligned with rcv_nxt, are processed and other segments 452 are dropped. Thus, it can be determined that the previously placed out of order segments were correctly placed. If out of order segments would be stored in the out of order receive buffer, there is the danger that they will align or possibly overlap with previously placed out of order segments and that it would not be detected that out of order PDU's had been placed erroneously. An optimization is possible that uses two sets of fragment structures, one of the out of order placements in host memory and one for the out of order placements in dedicated receive buffer memory. This optimization may be used to detect errors in the previous out of order placements to host memory and re-delivering in-order all the PDU starting at rcv_nxt. Without this optimization: In step 453 the in-order PDU cannot overlap with previously placed out of order PDU or there is a fatal error 454, because this would indicate that when the out of order placement determined it was placing an out of order PDU, it in fact wasn't out of order even though the PDU checks passed for that out of order PDU. In 455, the in-order PDU is placed and, if it exactly fills a hole, the rcv_nxt is advanced beyond that first fragment, or if the PDU does not reach the first fragment, the rcv_nxt is advanced beyond the current TCP segment. If the segment does not contain exactly one PDU, it is determined if the segment contains more than one PDU and, in case it contains a partial PDU, wait for the TCP segment(s) that contain the remaining portion of the PDU and inductively derive PDU alignment. Once packets have been received so that no more fragments exist, the recovery process is completed and the next TCP segment can proceed from the top of FIG. 4a 400. Once PDU alignment is lost for a particular connection, out of order placement is disabled in FIG. 4a 403, but an optimization is to continue to compute the PDU check in 407 and re-enable out of order placement when the check is successful for a threshold number of PDU's in a row.

When out of order placement is enabled and the PDU is out of order 414 and if PDU contains an L-bit set, information is saved that is sufficient to send the completion when this L-bit becomes in-order, when all the holes in front of it have been filled. There may be limited capacity for storing such out of order L-bit state and if that capacity has already been reached, the PDU is dropped, and the sender will eventually need to re-transmit the PDU, at which time forward progress is made because some or all of the holes in the receive order have been filled.

When out of order delivery is enabled after a PDU is delivered to the host, it is checked 422 if any of the L-bit status bits are now in-order which indicates that the stored completion can now be delivered to the host.

We have described a process in which, where received PDU's are not aligned with a byte-stream payload, the receive processing includes storing inbound PDU-containing by stream segments within an intermediate dedicated buffer memory and then reading and further processing the PDU's from this buffer memory once alignment has been derived and a whole PDU has been buffered. A PDU can then be read from the dedicated memory buffer and the PDU payload portion placed in the final destination buffer in system memory.

What is claimed is:

1. A method of processing PDU ("protocol data unit") data carried as payload of a byte-stream segment of a byte-stream oriented connection, comprising:
   over the byte-stream oriented connection, receiving the byte-stream segment;

computing a data verification value over the byte-stream segment payload;
comparing the computed data verification value with a value in the byte-stream segment payload located where the data verification value should be assuming the PDU is aligned within the byte stream segment payload;
comparing a length field in a header of the byte-stream segment with a value in the byte-stream segment payload located where a PDU length value should be assuming the PDU is aligned within the byte-stream segment payload; and
based on a result of the comparing steps, determining whether the PDU is aligned within the byte-stream segment payload.

2. The method of claim 1, further comprising:
repeating the steps of claim 1 for a plurality of byte-stream segments of the byte-stream, wherein the plurality of byte-stream segments collectively include a PDU stream;
placing at least one of the PDUs directly into destination memory of a host;
determining that a hole exists in the PDU stream carried by the received byte-stream segments;
maintaining at least one island indication in the destination memory; and
placing at least some of the PDUs in the destination memory indicated by the maintained at least one island indication.

3. The method of claim 2, further comprising:
verifying that a received PDU is consistent with a maintained island; and
based on the verifying step, providing the verified received PDU directly into the destination memory.

4. The method of claim 1, wherein:
based on determining that the PDU is not aligned with the received byte-stream segment, saving at least a portion of the received byte-stream segment in a receive buffer memory.

5. The method of claim 1, wherein:
based on determining the PDU is aligned with the byte-stream segment, saving the PDU directly to destination memory.

6. The method of claim 1, further comprising:
validating, for the PDU, a steering indication.

7. The method of claim 6, wherein:
validating the steering indication includes determining whether the steering indication is in a maintained list of candidate steering indications.

8. The method of claim 1, wherein:
upon determining that the PDU is not aligned within the byte-stream segment payload, performing recovery processing to validate that no previously-received PDU that was determined to be aligned with the byte-stream segment payload is actually not a PDU.

9. The method of claim 8, wherein:
the recovery processing includes, for subsequently received byte-stream segments, processing only those byte-stream segments for which it is determined to be received in order and dropping those byte-stream segments for which it is not determined to be received in order.

10. The method of claim 9, wherein the recovery processing is terminated upon a determination that all PDU's in the destination memory are complete and aligned PDUs.

11. The method of claim 9, wherein:
the recovery processing includes determining that at least some of the PDUs placed in the destination memory are overlapping and, based thereon, aborting the byte-stream oriented connection.

12. The method of claim 1, wherein:
the byte-stream oriented connection is a TCP connection.

13. The method of claim 1, wherein:
the PDU is an RDMA ("Remote Direct Memory Access") PDU.

14. The method of claim 1, wherein:
the byte-stream oriented connection is a TCP connection; and
the PDU is an RDMA ("Remote Direct Memory Access") PDU.

15. A network interface adaptor to interface a network to a host processor, comprising circuitry configured to process PDU ("protocol data unit") data carried as payload of a byte-stream segment of a byte-stream oriented connection, including being configured to:
over the byte-stream oriented connection, receive the byte-stream segment;
compute a data verification value over the byte-stream segment payload;
compare the computed data verification value with a value in the byte-stream segment payload located where the data verification value should be assuming the PDU is aligned within the byte stream segment payload;
compare a length field in a header of the byte-stream segment with a value in the received byte-stream segment payload located where a PDU length value should be assuming the PDU is aligned within the byte-stream segment payload; and
based on a result of the comparing steps, determine whether the PDU is aligned within the byte-stream segment payload.

16. The network adaptor of claim 15, wherein the circuitry is further configured to:
repeat the steps of claim 15 for a plurality of byte-stream segments of the byte stream, wherein the plurality of byte-stream segments collectively include a PDU stream;
place at least one of the PDUs directly into destination memory of a host;
determine that a hole exists in the PDU stream carried by the received byte-stream segments;
maintain at least one island indication in the destination memory; and
placing at least some of the PDUs in the destination memory indicated by the maintained at least one island indication.

* * * * *